(12) United States Patent
Kuwayama

(10) Patent No.: US 7,154,536 B2
(45) Date of Patent: Dec. 26, 2006

(54) DIGITAL CAMERA WITH A PERSONAL IDENTIFICATION

(75) Inventor: Akiko Kuwayama, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 672 days.

(21) Appl. No.: 10/084,181

(22) Filed: Feb. 28, 2002

(65) Prior Publication Data

US 2004/0201739 A1    Oct. 14, 2004

(30) Foreign Application Priority Data

Mar. 21, 2001    (JP)    ............... 2001-080044

(51) Int. Cl.
*H04N 5/225* (2006.01)

(52) U.S. Cl. ............... 348/207.99; 382/115; 382/116

(58) Field of Classification Search ............ 348/116, 348/231.2, 161, 77, 207, 207.99; 382/124; 396/297
See application file for complete search history.

(56) References Cited

U.S. PATENT DOCUMENTS

| | | | |
|---|---|---|---|
| 6,433,818 B1 * | 8/2002 | Steinberg et al. | 348/161 |
| 2001/0002933 A1 * | 6/2001 | Satoh | 382/124 |
| 2001/0043728 A1 * | 11/2001 | Kramer et al. | 382/124 |
| 2002/0054224 A1 * | 5/2002 | Wasula et al. | 348/232 |
| 2002/0191090 A1 * | 12/2002 | Safai | 348/239 |
| 2003/0035054 A1 * | 2/2003 | Ohmura | 348/231.2 |
| 2005/0036656 A1 * | 2/2005 | Takahashi | 382/100 |

FOREIGN PATENT DOCUMENTS

| | | |
|---|---|---|
| JP | 2000-115624 | 4/2000 |
| JP | 2000-147623 | 5/2000 |

OTHER PUBLICATIONS

Seto et al, "Activities for Standardization of Test and Evaluation of Biometrics Authentication Technologies in Japan" The Journal of the Institute of Electronics, Information and Communication Engineers, vol. 83, No. 8, pp. 624-629 (2000).

Shinozaki, "Fingerprint Sensor Challenging a Taboo of Semiconductor", CX-PAL Sony Semiconductor News, vol. 41, pp. 24-25 (1999).

* cited by examiner

*Primary Examiner*—David Ometz
*Assistant Examiner*—Anthony Daniels
(74) *Attorney, Agent, or Firm*—Birch, Stewart, Kolasch & Birch, LLP

(57) ABSTRACT

A digital camera with a personal identification which is provided with a fingerprint comparator for comparing fingerprint data inputted and sensed by a fingerprint sensor with those already registered with a fingerprint register. An identifier of one of the registered fingerprint data identified with the inputted data is stored in an authorizer of the camera. When a microcomputer of the camera receives an instruction, it accesses the authorizer to execute the instruction if the instruction is intended to handle a frame of image data associated with an identifier stored in the authorizer.

28 Claims, 7 Drawing Sheets

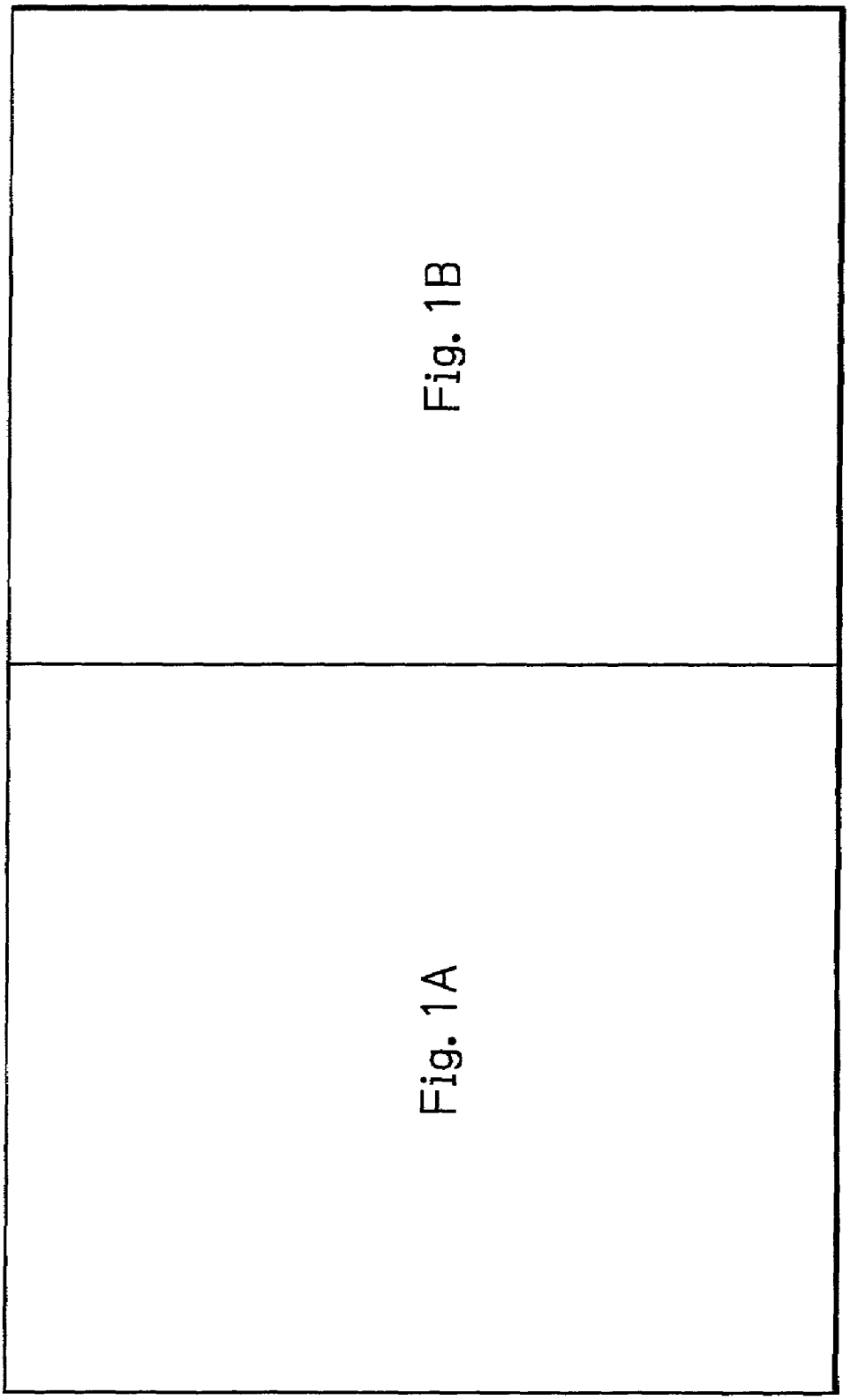

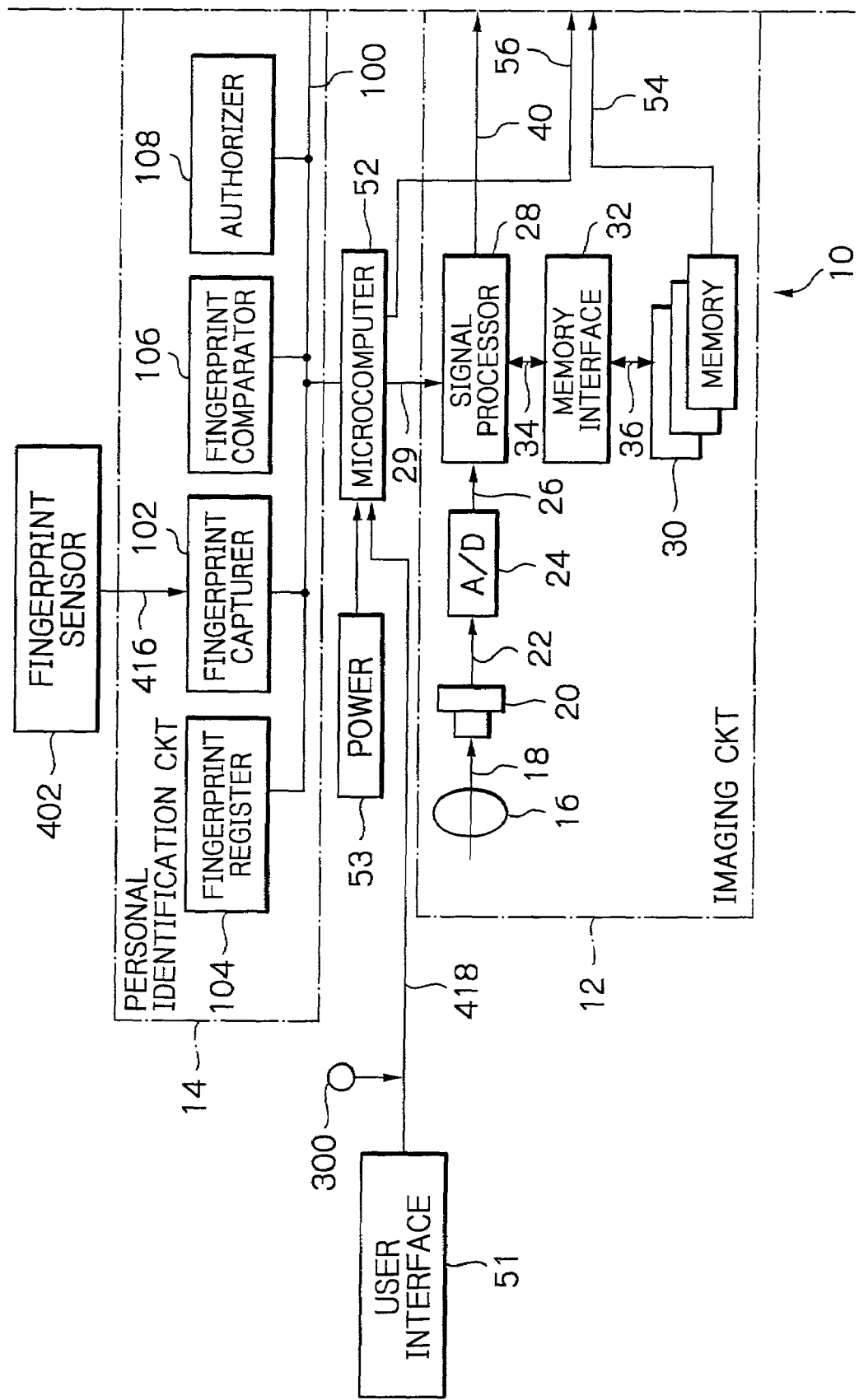

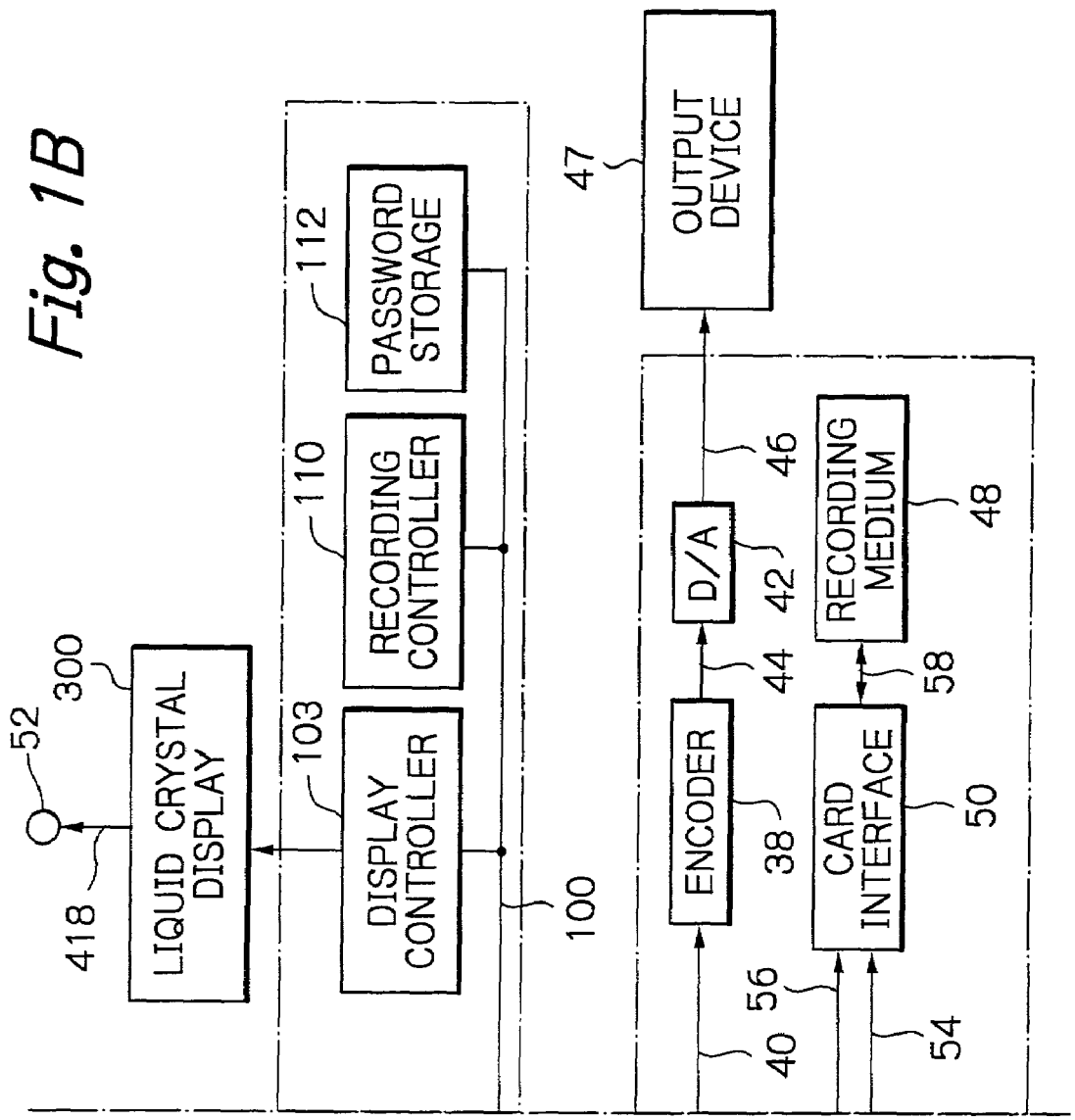

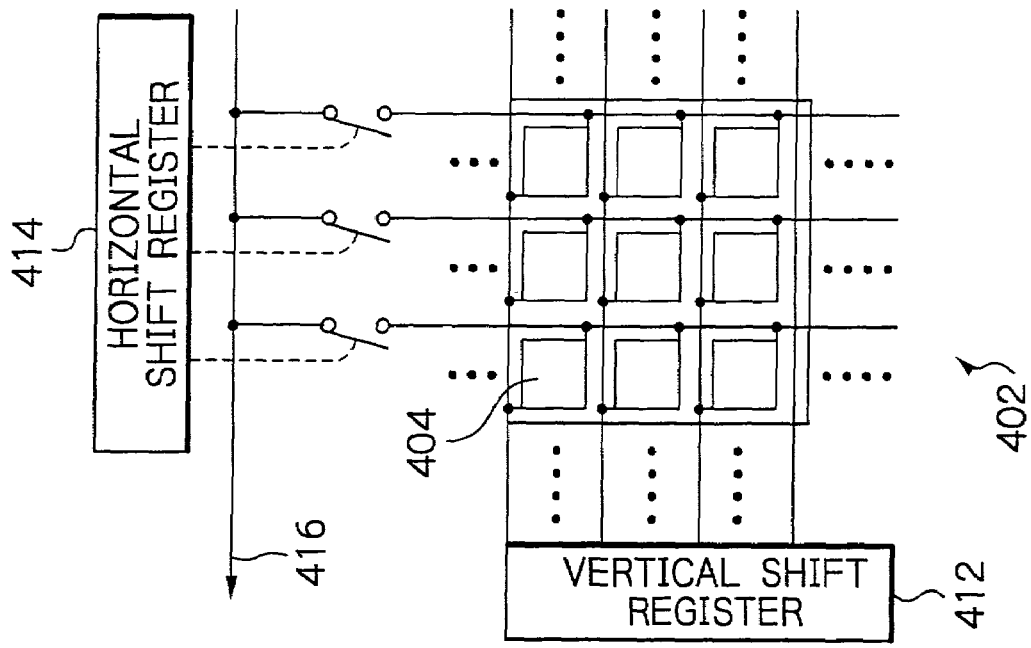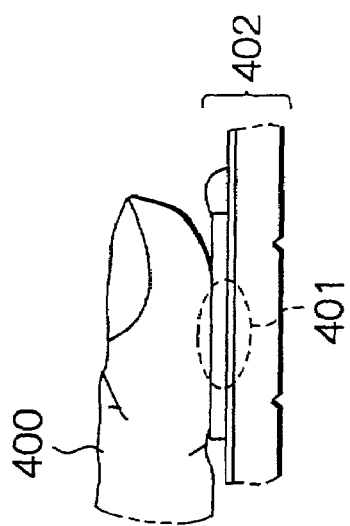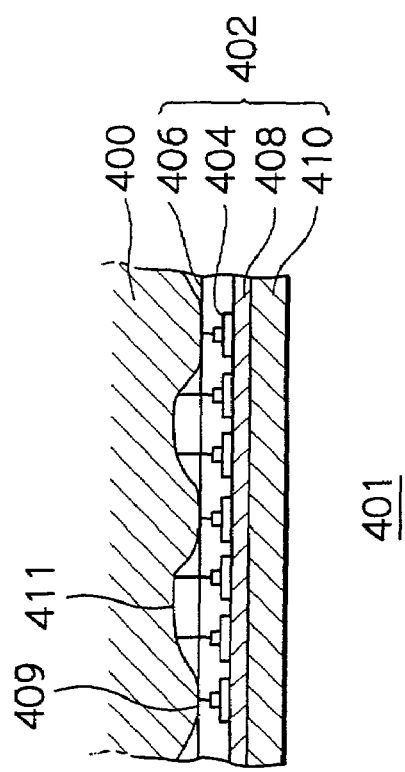

DIGITAL CAMERA WITH A PERSONAL IDENTIFICATION

BACKGROUND OF THE INVENTION

1. Field of the Invention

The present invention relates to a digital camera, and more specifically, to a digital camera with a personal identification.

2. Description of the Background Art

An image data formed by and stored in a digital camera is private information that should be protected against people other than a person who picked up the image. Therefore, either when a camera is stolen or when the camera is not stolen, the camera should forbid an undesirable case that a stranger freely views the data stored in the camera.

Therefore, there is a need for providing a camera with the personal identification function to protect user's privacy. Recently, biometrics technology has received attention as means to implement this function. By means of biometrics technology, human physical characteristics such as fingerprints, irises, and voiceprints could provide a personal identification system that forces a person neither to carry nor to memorize a specific identification such as a magnetic card or a password.

For example, Japanese Patent Laid-Open Publication No. 2000-115624 discloses a digital camera that recognizes a person other than the owner of the camera by fingerprints and prevents the person from picking up an image with the camera and from reproducing or making a copy of an image data already stored in the camera. In addition, Japanese Patent Laid-Open Publication No. 2000-147623 discloses a digital camera that distinguishes people permitted to use the camera from non-permitted people by retina patterns.

However, those background arts only protect image data against a thief who stole the camera. More specifically, if several people are permitted to use the same camera alternately, one of them cannot protect his or her own data from the other ones. This is because any one of them is permitted to use the camera i.e. registered with the camera so that he or she may freely handle (reproduce, delete, or make a copy of) image data taken even by the others.

SUMMARY OF THE INVENTION

The object of the present invention is to provide a digital camera that solves the above problem and that protects data of each person sharing the same camera.

In accordance with the present invention, a digital camera for picking up a scene with an image sensor and forming a frame of image data representative of the scene with a signal processor includes a fingerprint sensor provided on an exterior of the digital camera for sensing a fingerprint to produce inputted finger print data. The digital camera further includes a fingerprint register for registering fingerprint data with specific identifiers allotted, a memory for storing therein frames of image data so that each frame is associated with one of the identifiers, a comparison circuit for comparing the inputted fingerprint data with the fingerprint data registered with the fingerprint register to produce identified fingerprint data, an authorizer for storing therein an identifier specific to the fingerprint data identified by the comparison circuit, a user interface circuit for inputting an instruction to the digital camera, and a controller for accessing the authorizer to reference the identifier stored in the authorizer and executing an instruction if the instruction is intended to handle a frame of image data associated with the identifier stored in the authorizer.

In accordance with the present invention, a person whose fingerprint data is registered with the digital camera is authorized to handle not the whole image data stored in the digital camera but only image data associated with an identifier specific to the fingerprint data of the person.

BRIEF DESCRIPTION OF THE DRAWINGS

The objects and features of the present invention will become more apparent from consideration of the following detailed description taken in conjunction with the accompanying drawings in which:

FIG. 1 shows how to combine FIGS. 1A and 1B;

FIGS. 1A and 1B, when combined as FIG. 1, are a schematic block diagram showing a preferred embodiment of a digital camera according to the present invention;

FIG. 2A is a side view showing a human finger placed on a fingerprint sensor to which a fingerprint capturer shown in FIG. 1A is connected;

FIG. 2B is a conceptual enlarged cross-sectional view of a part enclosed with the dotted circle in FIG. 2A;

FIG. 2C is a schematic top view of the sensor shown in FIG. 2B;

DESCRIPTION OF THE PREFERRED EMBODIMENT

Figure 3:
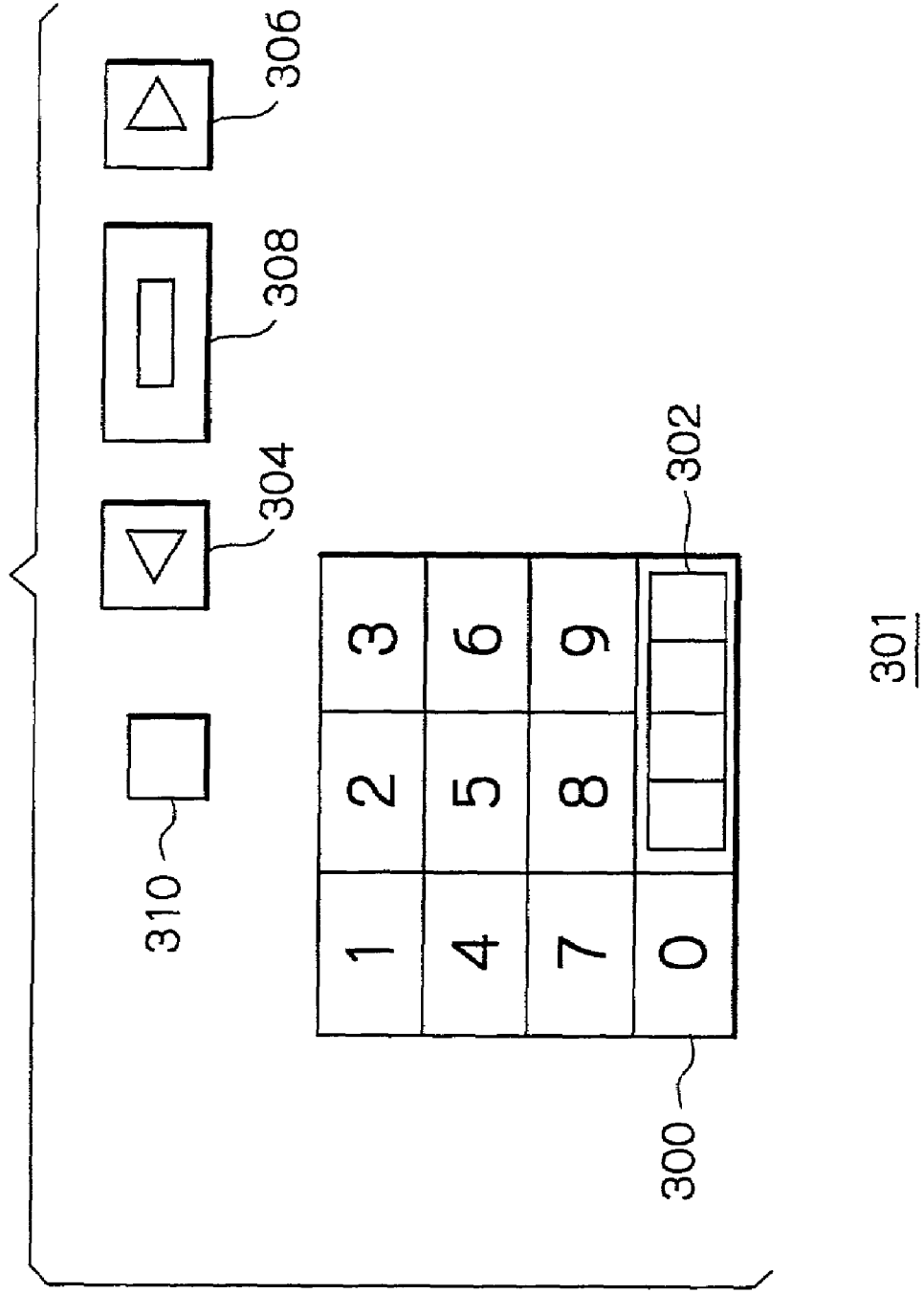
FIG. 3 is a schematic plan view of a liquid crystal display and keys provided on the back of the digital camera shown in FIGS. 1A and 1B.

With reference to the accompanying drawings, a preferred embodiment of a digital camera according to the present invention will be described in detail. In the description below, a signal is represented by the reference numeral of a line on which the signal is sent. In the drawings, the same reference numerals denote the like structural elements and elements not related to the present invention are omitted.

With reference to FIGS. 1A and 1B, a digital camera 10 according to the present invention is divided roughly into two circuits: an imaging circuit 12 and a personal identification circuit 14. The imaging circuit 12 is adapted to photo-electrically convert a light from a subject field into image signals and processes the signals for recording them in the form of a frame of image data. A lens 16 is adapted to capture a light 18 from the subject field. The lens 16 works for an image sensor for picking up a scene. A solid-state imaging device 20 is adapted to photo-electrically convert the light 18 into electric image signals 22. The imaging device 20 has an output 22 connected to an analog-to-digital (A/D) converter 24, which is adapted to convert the image signals 22 from analog to digital to produce digital image signals 26.

The A/D converter 24 has an output 26 connected to a signal processor 28, which is adapted to perform signal processing for the digital image signals 26. A user interface 51 is adapted to input an instruction issued from a person to the digital camera. The interface is preferably made up of several buttons each of which corresponds to one of various instructions such as picking up a scene, reproducing an image and soon. A microcomputer 52 is adapted to receive instructions 418 inputted via the user interface 51. The microcomputer 52 is connected via a control line 29 to the signal processor 28 to control all the performances of the signal processor 28 based on the received instructions 418. The signal processor 28 has an output 34 connected via a memory interface 32 to a frame memory 30, which is adapted to record digital image signals 36 that have been processed by the signal processor 28.

As described above, a newly formed frame of image data is recorded into the memory 30 after being processed by the signal processor 28. Conversely, a frame of image data already recorded in the memory 30 may also be reproduced by the signal processor 28. A frame of image data reproduced by the signal processor 28 may be outputted through an encoder 38 to an output device 47 for viewing. In addition, the signal processor 28 is able not only to record and reproduce a frame of image data but also to delete or make a copy of the frame recorded in the memory 30. The signal processor 28 records, reproduces, deletes, and make a copy of a frame of image data all under the control of the microcomputer 52 based on the instructions 418 inputted through the user interface 51.

The signal processor 28 has an output 40 connected to the encoder 38 which is adapted to convert image signals to video signals such as the NTSC (National Television System Committee) standard. The encoder 38 has an output 44 connected to a D/A (Digital-to-Analog) converter 42 which is adapted to convert signals 44, which have been converted to digital image signals for use as video signals, back to analog signals 46. Video signals 46 are sent to an output device 47 such as a display.

The memory 30 and the microcomputer 52 respectively have output terminals 54 and 56 connected via a card interface 50 to a recording medium 48 such as a magnetic disc removable from the camera 10. The recording medium 48 receives information, such as image data and passwords required to view the data, from the card interface 50 on a signal line 58 and records therein the received information.

It should be noted that frames of image data recorded in the memory 30 and outputted to the recording medium 48 are separately stored in one or more folders specific respectively to a person. More specifically, frames of image data taken by a person are stored in his or her own folder to distinguish them from those of the other people. In other words, frames of image data stored in a folder belong to a person who owns the folder. How a folder specific to a person is created will be described later.

The personal identification circuit 14 is adapted to identify a person to check if the person is permitted to use the camera 10. In addition, even if the person is permitted to use the camera 10, the personal identification circuit 14 further checks if an instruction issued by the person could be executed. Only when the instruction is authorized to be executed, the circuit 14 executes the instruction, as will be described later. The microcomputer 52 has a control line 100 connected to all the units, which are included in the personal identification circuit 14, adapted to operate under the control of the microcomputer 52 based on the instructions 418 inputted via the user interface 51.

A fingerprint capturer 102 is connected to a silicon chip fingerprint sensor 402 provided on an exterior of the digital camera 10. In this preferable embodiment, the sensor 402 is provided on a shutter release button of the camera 10. With reference to FIGS. 2A, 2B and 2C, the silicon chip fingerprint sensor 402 included in this embodiment is adapted to sense a fingerprint to produce inputted fingerprint data. The sensor 402 is composed of an array of 192×128, 80 μm thick aluminum electrodes 404, and is covered with an insulating film 406. The size of each electrode and the number of electrodes in this embodiment are illustrative and not restrictive. The sensor 402 has an inter-layer film 408 and a silicon layer 410 below the electrodes 404. A capacitor is formed by three elements, which are the aluminum electrodes 404, insulating film 406, and the finger 400 electrically conductive and placed directly on the surface of the insulating film 406. Because a distance between the finger and each electrode 404 varies depending on a place i.e. a ridge 409 or a trough 411 of the surface of the finger, each capacitor formed by each electrode 404 has a capacity different from those of other capacitors. Accordingly, when applying a predetermined voltage to the electrodes 404, different amounts of electric charges are accumulated under the electrodes 404. The electric charges are transferred to a vertical shift register 412 and to a horizontal shift register 414 as shown in FIG. 2C, and then converted to voltages. In this way, the ridges 409 and troughs 411 of the surface of a fingerprint are sensed and outputted in the form of electrical signals 416.

As described above, the fingerprint capturer 102 is adapted to capture the fingerprint of a finger placed on the shutter release button. The fingerprint capturer 102 includes an A/D converter (not shown) and thereby digitizes the obtained voltage and transfers it to a fingerprint comparator 106 which will be described later.

The camera 10 has on its back 301 a liquid crystal display 300 connected to a display controller 103. Under the control of the controller 103, the display 300 displays a message prompting a person to input an instruction to the camera 10. For example, the display 300 displays a password entry area 302 to prompt a person to input a password 418, or displays a message to prompt a person to input fingerprint data when no fingerprint is sensed by the sensor 402 at the time an instruction 418 is inputted.

In this embodiment, the fingerprint sensor 402 is attached to the shutter release button where a person's finger 400 is necessarily placed when he or she uses the camera 10. Correspondingly, any instruction 418 such as recording and reproduction cannot be executed unless a person's fingerprint is sensed by the sensor 402 at the time the person issues the instruction 418. As will be described later more in detail, the microcomputer 52 determines whether to execute such an instruction.

The fingerprint sensor 402 is provided in the shutter release button, which is originally provided for picking up a scene, in this embodiment. Therefore, a person is required to touch the shutter release button to input the fingerprint data even when the person would like to issue an instruction other than picking up an image, such as reproduction of an image. This involves sometimes mistakenly pressing the release button. To prevent such an erroneous operation, the fingerprint sensor 402 may be provided in a portion other than the shutter release button. Even in such a case, the fingerprint sensor 402 should be provided in a portion where a person's finger always touches.

A fingerprint register 104 is adapted to register fingerprint data with specific folder names allotted. People who own the registered fingerprint data are permitted to use the camera 10. Such people are hereinafter called "registered users". Because the frames of image data recorded in the memory 30 are separately stored in the folders, the frames are associated with one of the folder names. A folder name therefore identifies a frame of image data as belonging to specific registered fingerprint data i.e. one of the registered users. Although there is a one-to-one correspondence between registered fingerprint data and a folder name in this embodiment, it is also possible to create a many-to-one or a many-to-many correspondence depending on the fingerprint registration procedure.

The fingerprint comparator 106 includes a first and a second buffer (not shown) into which the fingerprint data to be compared are stored for checking their identity. Newly inputted fingerprint data received by the fingerprint capturer 102 is stored into the first buffer. The inputted finger print data is captured by the capturer 102 only in the form of digital voltage values. Therefore, the fingerprint comparator 106 is adapted to convert the voltage values to binary values with respect to a predetermined threshold. By means of this conversion, it is determined for any given position in the new fingerprint whether the position is a ridge or a trough. Other fingerprint data that is read out from the fingerprint register 104 and that is already converted to binary values is stored into the second buffer.

The comparator 106 treats binary fingerprint data as matrices and calculates the norms (distance) therebetween to compare the fingerprints. To make this comparison, the fingerprint matrices are overlapped each other at several fixation points by shifting them and a norm is calculated for each point. If the minimum norm is smaller than a predetermined threshold, the two fingerprints are recognized identical; if the minimum is larger than the predetermined threshold, the two fingerprints are recognized different.

An authorizer 108 is adapted to store therein a folder name of one of the registered users. The authorizer 108 has a buffer (not shown) in which a folder name is stored. If the comparator 106 identifies the registered fingerprint data with the newly inputted data, the fingerprint register 104 sends the folder name specific to the identified fingerprint data to the authorizer 108 to store the folder name in the buffer of the authorizer 108. If the comparator 106 identifies no registered fingerprint data with the newly inputted data, the buffer remains a blank and no folder name is stored therein. This buffer is volatile and therefore its contents are lost when the camera 10 is turned off. In this way, one of the registered users could be referenced from the authorizer 108. When the registered user thus referenced issues an instruction, he or she is further checked if he or she is authorized to issue the instruction, as will be described later.

As well as the authorizer 108, a recording controller 110 has a buffer (not shown) which is adapted to store a folder name specific to the identified fingerprint data. However, the authorizer 108 and the recording controller 110 differ from each other as described below. The authorizer 108 is accessed by the microcomputer 52 to check the authority of a registered user to handle already recorded image data, whereas the recording controller 110 is accessed to know the registered user's folder name to record newly formed image data in the folder.

A password storage 112 is adapted to store a password, which is inputted via the display 300 and the buttons 304, 306, 308 and 310 working as a password inputting circuit through the line 418. The password shown in a password entry area 302 of the display 300 is inputted in association with the folder name of the person. Note that a password is not necessary as long as a person uses the camera 10. This is because the person is identified with the fingerprint. On the other hand, a password is required to view image data outputted in the form of a folder via the recording medium 48 into other recording units such as a personal computer. In that case, even if the personal computer does not have a fingerprint sensor, the password may be used instead as personal identification to protect user's data.

The signal processor 28 and elements 102, 103, 104, 106, 108, 110 and 112 included in the personal identification circuit 14 are connected to the microcomputer 52 which is adapted to control those elements to implement the personal identification function. A power switch 53 is also connected to the microcomputer 52 to allow the power of the camera 10 to be turned off as necessary. The microcomputer 52 is adapted to receive instructions 418, such as recording, reproduction, deletion, and making a copy of image and to control the signal processor 28 to execute the instructions.

Upon receiving an instruction 418, the microcomputer 52 checks if a fingerprint is also sensed by the fingerprint sensor 402 at the same time. More specifically, every time the microcomputer 52 receives an instruction 418, it causes the fingerprint capturer 102 to capture fingerprint data from the sensor 402. If no fingerprint is sensed i.e. if the instruction is issued under the condition that a person's finger does not touch the shutter release button where the user's finger naturally touches, the microcomputer 52 does not respond to the instruction. This is because such an unusual use of the camera 10 should be forbidden. In this way, the configuration of the camera 10 requires a person to touch the sensor 402 provided on the shutter release button when issuing an instruction, in order to check the personal identification.

If a fingerprint is sensed with an instruction, the microcomputer 52 turns off the power 53 in the case no registered fingerprint data is identified with the sensed i.e. inputted data. More specifically, the microcomputer 52 accesses the authorizer 108 in which the comparison result produced by the fingerprint comparator 106 is held and, if the buffer of the authorizer 108 remains a blank, turns off the camera power 53. On the other hand, if a folder name of a registered user is stored in the buffer, the microcomputer 52 keeps the power on for permitting the registered user to keep using the camera 10. Next, the microcomputer 52 accesses the authorizer 108 to reference the folder name therein and executes the instruction if the instruction is intended to handle a frame of image data associated with the folder name stored in the authorizer 108. If the registered user is not authorized to issue the instruction, the microcomputer 52 does not respond to the instruction. If the registered user is authorized to do so, the microcomputer 52 causes the signal processor 28 to start executing the instruction.

Figure 4A:
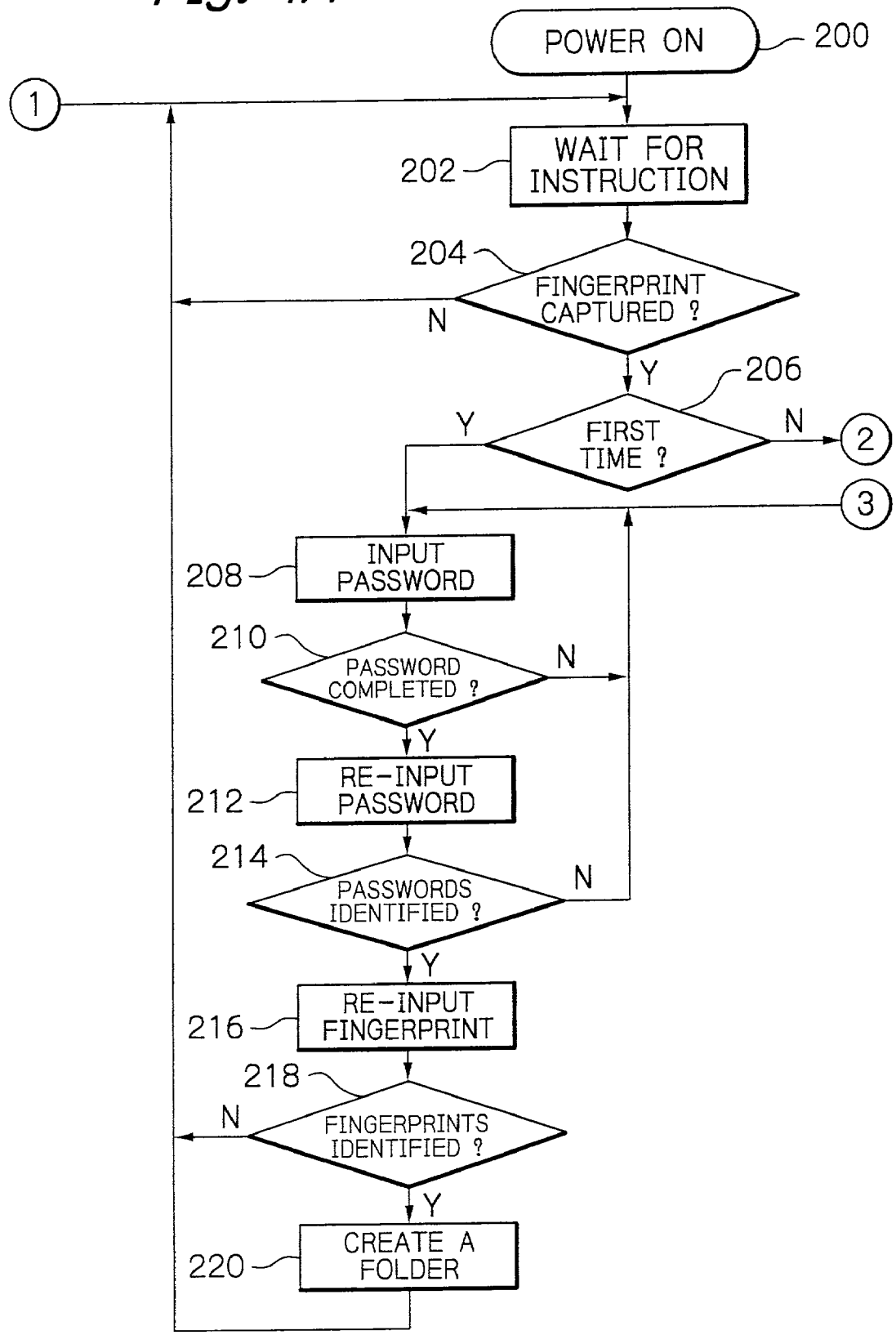
FIG. 4A is a flowchart useful for understanding an operation executed when the camera in the embodiment shown in FIG. 1 is used for the first time after it was purchased.
Figure 4B:
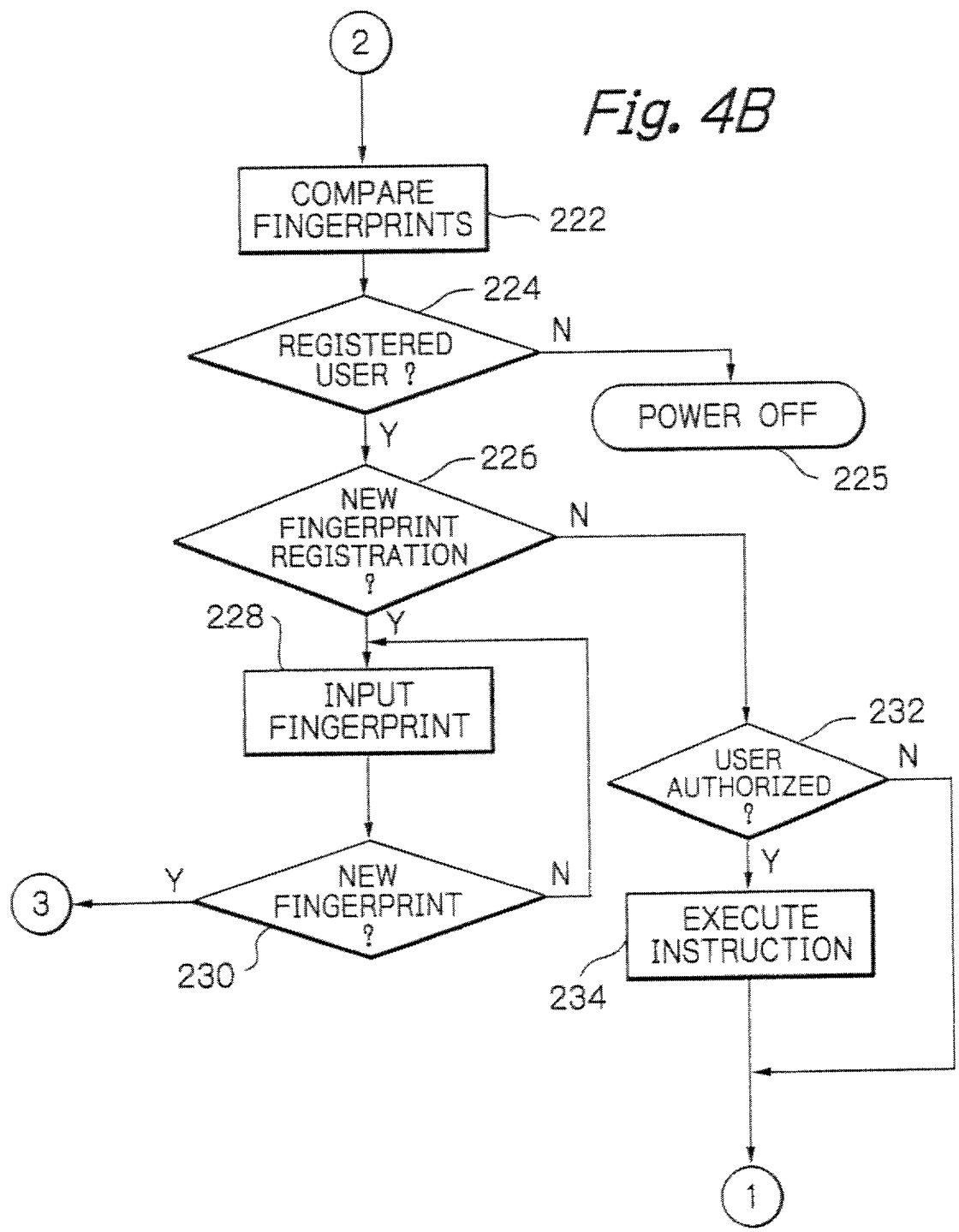
FIG. 4B is a flowchart useful for understanding an operation executed when the camera shown in FIG. 1 is already used after purchased.

FIGS. 4A and 4B are the flowcharts showing the operation of the digital camera 10 in the embodiment according to the present invention shown in FIGS. 1A and 1B. It should be noted that the operation of the imaging circuit 12 is not included in FIGS. 4A and 4B. This is because the present invention is primarily directed to the personal identification function implemented by the personal identification circuit 14 controlled by the microcomputer 52. The following describes the operation of the digital camera 10 with the configuration described above with reference to FIGS. 1A and 1B and FIGS. 4A and 4B.

When the user turns on the power switch 53 of the camera 10 to turn on the power (step 200), the microcomputer 52 shifts to the instruction wait state (step 202). When an instruction 418 is issued, the microcomputer 52 checks if the fingerprint capturer 102 captures fingerprint data from the fingerprint sensor 402 at the time the instruction is issued (step 204). If no fingerprint data is captured, in other words, if a person issued the instruction without touching the shutter release button, the microcomputer 52 performs no operation for the instruction and returns to step 202 to wait for the next instruction.

If fingerprint data is captured by the fingerprint capturer 102, it is stored in the first buffer of the fingerprint comparator 106. Then, it is checked if the camera 10 is used for the first time after it was purchased (step 206). This check is made because, if this is the first time the camera 10 is used after purchased, there is no registered user. Under the condition of no registered user, an attempt to compare the captured fingerprint with that of the registered users always results in "no hit" and therefore the camera 10 cannot be used forever. Accordingly, the above-mentioned check is made so that the microcomputer 52 accesses the fingerprint register 104. If fingerprint data is registered with the register 104, the microcomputer 52 determines that this is not the first time. If no fingerprint data is registered, the microcomputer 52 determines that this is the first time.

When it is found that the camera 10 is used for the first time after it was purchased, the camera 10 is operated as below. The microcomputer 52 causes the display controller 103 to display an image of key pad on the liquid crystal display 300 (FIG. 3) for prompting the user to input a password (step 208). In this embodiment, the digital camera 10 has on its back 301 the liquid crystal display 300. FIG. 3 is a schematic plan view showing the back 301 of the digital camera 10 that includes the liquid crystal display 300. The liquid crystal display 300 displays numbers, 0–9, any one of which has a number selection cursor thereon that blinks. A password entry area 302 is provided to indicate an inputted, four-digit number as a password. The password entry area 302 also has a cursor blinking in the position into which the user is to input a digit.

To input a password, right and left arrow buttons 304 and 306, a select button 308, and menu/execute button 310 are used, which are all provided on the back 301 of the camera 10. The left and right arrow buttons 304 and 306 are depressed to move the cursor within the number area, the select button 308 is to determine a desired number, and the cursor in the password entry area 302 moves automatically to the next position when a digit is inputted. When a password is being inputted, a special character such as an asterisk "*" is displayed instead of an inputted number to prevent the password from being stolen. To input a selected password or to correct a password before establishing it, the user may press the menu/execute button 310 to invoke an operation window that allows the user to input or clear the password. The password inputted and displayed on the display 300 is sent to the microcomputer 52 through the line 418.

When inputting a password is completed (step 210), the person is prompted by the microcomputer 52 to input the same password again (step 212). A check is made by then microcomputer 52 if the two passwords inputted consecutively are identified with each other (step 214). If they are not identified with each other, control is passed back to step 208 to prompt the person to input the password again. If they are identified with each other, the person is prompted to re-input the fingerprint data by touching the shutter release button again (step 216). To prompt the person to re-input the fingerprint data, the microcomputer 52 causes the controller 103 to display on the liquid crystal display 300 a message inviting the person to touch the shutter release button.

The re-inputted fingerprint data captured by the fingerprint capturer 102 is stored into the second buffer of the fingerprint comparator 106 for comparison with the first fingerprint data that was stored in the first buffer (step 218). If those two fingerprint data are not identified with each other, the microcomputer 52 displays a message indicating the abnormal condition on the liquid crystal display 300 and transfers control back to step 202 to wait for the next instruction. If the two fingerprint data are identified with each other, the fingerprint data is given a folder name specific to the person and is registered with the fingerprint register 104. The inputted password is made to correspond to the folder name and is stored in the password storage 112. In addition, the microcomputer 52 causes the signal processor 28 to create, in the memory 30, a folder with the above-mentioned folder name (step 220). This folder is the registered person's private one. The microcomputer 52 also stores the folder name in the buffer of the authorizer 108. This folder name identifies the registered person.

After the identification, control is passed back to step 202 to wait for the next instruction. The person with the fingerprint data registered as described above is the only registered user who is permitted to use the camera 10 at this moment. This ensures that nobody can use the camera 10 without his or her permission. In other words, a stranger cannot use the camera 10 before the registered user touches the camera for identification.

When it is found that the camera 10 has been already used by one or more users and their fingerprint data have been registered with the register 104, the camera 10 is operated as below. In this case, registered fingerprint data is read out from the register 104 into the second buffer of the fingerprint comparator 106 one after another until it is identified with the inputted fingerprint data captured at step 204 and stored in the first buffer of the comparator 106 at step 206 (step 222). It is thus checked by the microcomputer 52 if the person is one of the registered users (step 0224). If no fingerprint data is identified with the captured data, the microcomputer 52 turns off the power switch 53 (step 225). Because in this case it is considered that the person is an unregistered stranger and that he or she touches the camera 10 without permission of a registered user.

On the other hand, if fingerprint data is identified with the captured data, it is further checked by the microcomputer 52 if the instruction 418 received at step 202 is intended for a new fingerprint registration (step 226). If the instruction 418 is a new fingerprint registration one, the microcomputer 52 causes the display controller 103 to display a message on the liquid crystal display 300 prompting a new person to input his or her own fingerprint data (step 228). This message may be the same as that displayed in step 216.

The microcomputer 52 then causes the fingerprint capturer 102 to capture the fingerprint data and stores the captured data into the first buffer of the fingerprint comparator 106. The fingerprint comparator 106 compares the data of the first buffer with the other fingerprint data already registered with the fingerprint register 104 in the same manner as in steps 222 and 224 to check if the data in the first buffer is a new one (step 230). If the fingerprint data of the first buffer is that of the registered user who still keeps holding the camera 10, the new person's fingerprint inputting step 228 is repeated until the camera 10 is handed to the new person to be registered. If no fingerprint data is identified with the newly inputted data, and therefore the newly inputted fingerprint data is recognized as new one, control is passed to step 208. The microcomputer 52 then promotes the new person to input a password in the same way as when the camera is used for the first time after it was purchased and registers the newly inputted fingerprint data with the fingerprint register 104.

If the instruction received at step 226 is not a new fingerprint registration one but one for handling already recorded frames of image data, it is checked if the registered user who issued the instruction is authorized to issue the instruction (step 232). More specifically, it is checked if the instruction is intended to handle a frame of image data associated with a folder name other than that stored in the authorizer 108. For example, if the instruction 418 is reproduction of a recorded-image, the microcomputer 52 accesses the authorizer 108. If the instruction 418 is intended to reproduce a frame of image data stored in a folder whose folder name is held in the authorizer 108, the instruction is executed. Because the instruction is intended to reproduce the registered user's own data (step 234), and then control is passed back to step 202. However, if the instruction is intended to reproduce a frame of image data stored in the other folders, the instruction is not executed. Because the instruction, though issued by the registered user, is intended to reproduce a frame of image data recorded by someone else, and therefore control is only passed back to step 202. This protects the registered users from each other.

As described above, if the instruction received at step 226 is intended to handle an image data already recorded, it is checked, whether the instruction is to handle the registered user's own data. By contrast, if the instruction is to record a newly formed image data, the registered user is authorized to issue the instruction unconditionally i.e. without accessing the authorizer 108 in step 232. Accordingly, the instruction is executed in step 234 so that the microcomputer 52 accesses the recording controller 110 to know the registered user's folder name. The image data is then recorded in the folder created in the memory 30.

The microcomputer 52 may be adapted to turn off the power switch 53 automatically when no instruction is received for a predetermined length of time in any one of steps shown in FIGS. 4A and 4B. This function, if provided, would prevent a stranger from using the camera 10, forbid an unauthorized instruction to the camera 10 and save power.

A stranger could not use the camera 10 in the above-explained embodiment without permission of a registered user even if the stranger has no intention to handle a registered user's image data. If this is inconvenient, a stranger may be given a permission only to take an image data and to review the image data. More specifically, such a restricted permission of using the camera 10 can be given to anyone regardless of the result of fingerprint checking by providing a guest folder allowing a stranger to freely handle image data therein.

In the above embodiment, registered users are completely independent of one another and therefore they cannot handle image data in someone else's folder. However, the authorizer 108 that controls the authorization may be modified so that users are divided into user groups. In this case, folders owned by the registered users may be grouped under one or more super folders standing for the user groups. Fingerprint data registered with the fingerprint register 104 may have a super folder name in addition to an ordinary folder name. In this way, a super folder is adapted to allow all the members of the user group to handle an image data recorded in any one of the folders under the super folder.

The illustrative embodiment is adapted to require a password when recorded image data are outputted, via the recording medium 48, to other image processing units such as a personal computer. That is because other image processing units do not always have the personal identification function. Therefore, when outputting an image data from the memory 30 to the recording medium 48, the microcomputer 52 accesses both a folder in the memory 30 in which the image data is stored and the password storage 112. The microcomputer 52 necessarily obtains from the storage 112 a password corresponding to the folder and then records the folder as well as the password onto the recording medium 48.

Since an image-processing unit such as a personal computer receives an image data stored in a folder recorded in the medium 48 with a corresponding password as above, the unit can be adapted to prevent a person from handling the image data without inputting the password. In this way, even when the fingerprint capturing device is not provided by a image-processing unit, a password which is used as the personal identification protects data.

The present invention has been described above with reference to the embodiment of the digital camera. However, it is to be readily understood that the personal identification circuit 14 in the above embodiment may be installed not only on a digital camera but also on all devices shared by a plurality of users.

As described above, the digital camera according to the present invention not only prevents unregistered strangers from using the camera but also, even when a plurality of users are registered with the digital camera, authorizes only the owner of a folder to reproduce, delete, or make a copy of the image data stored in the folder. In other words, only a user may handle image data taken by the user and therefore image data of one user can be protected from the other users.

In addition, because a fingerprint is specific to a person and is less likely to change with time, the users can be identified reliably.

The present invention can be applied also to a digital camera shared by an undefined number of users. For example, in a theme park, it is useful to locate digital cameras with a fingerprint sensor according to the subject invention at several desired places. In this case all the cameras are adapted to be controlled centrally by a computer. The cameras are adapted to transfer scene image data and fingerprint data to the computer that processes those data in the same manner as that of the personal identification circuit 14 and the microcomputer 52. The computer is provided with a fingerprint sensor, too. The computer can be located, for example, at the exit of the theme park.

Before picking up a scene at the several places in the theme park, the user touches the sensor with a finger to create his or her own folder in the central computer. The image data representative of the scene picked up at various places of the theme park are recorded in the folder created for each user by the computer.

When a guest leaving the theme park touches the sensor provided by the computer, a list of scene image data recorded in his or her own folder may be displayed on a display of the computer, by means of identification using fingerprint data. This allows the guest to select desired ones of the scenes picked up by himself or herself and to take printed images thereof home. In addition, all image data formed on that day can be deleted from a memory of the computer after the theme park is closed so that the same cameras can be used the next day. That is, the cameras may be used repeatedly.

The entire disclosure of Japanese patent application No. 2001-080044 filed on Mar. 21, 2001, including the specification, claims, accompanying drawings and abstract of the disclosure is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A digital camera for picking up a scene with an image sensor and forming a frame of image data representative of the scene with a signal processor, comprising:
   a fingerprint sensor provided on an exterior of said digital camera for sensing a fingerprint to produce inputted fingerprint data;
   a fingerprint register for registering one or more fingerprint data with a specific identifier allotted for each registered fingerprint data;
   a memory for storing therein frames of image data so that each frame is associated with one of the identifiers;
   a comparison circuit for comparing the inputted fingerprint data with the one or more fingerprint data registered with said fingerprint register to produce identified fingerprint data;
   an authorizer for storing therein an identifier specific to the fingerprint data identified by said comparison circuit;
   a user interface circuit for inputting an instruction to said digital camera; and
   a controller for accessing said authorizer to reference the identifier stored in said authorizer and executing the instruction if the instruction is intended to handle a frame of image data associated with the identifier stored in said authorizer.

2. The digital camera in accordance with claim 1, further comprising a shutter release button on which said fingerprint sensor is provided.

3. The digital camera in accordance with claim 1, wherein said fingerprint sensor comprises a plurality of electrodes and an insulating film for forming capacitors in combination with a finger, and senses the finger's ridges and troughs according to each amount of electric charge accumulated under the electrodes.

4. The digital camera in accordance with claim 1, wherein frames of image data stored in said memory are associated with one of the identifiers so that the frames are separately stored in one or more folders prepared in said memory, said fingerprint register registers therewith folder names for the identifiers, and said authorizer stores therein a folder name.

5. The digital camera in accordance with claim 4, wherein the folders in said memory are grouped under one or more super folders, and the fingerprint data registered with said fingerprint register include folder names of the super folders.

6. The digital camera in accordance with claim 4, further comprising a record control circuit for storing a folder name specific to the fingerprint data identified by said comparison circuit,
   said controller recording, in response to an instruction to record a frame of image data formed by said digital camera, the frame into a folder having the folder name.

7. The digital camera in accordance with claim 4, further comprising:
   a password inputting circuit for inputting a password specific to a folder and adapted to be required to open the folder; and
   a password storage for storing the password,
   said controller outputting, in response to an instruction to output a folder from said memory to a recording medium, the folder and the password specific to the folder to the recording medium.

8. The digital camera in accordance with claim 1, wherein said authorizer stores no identifier as long as no fingerprint data is identified by said comparison circuit,
   said controller executing, in response to an instruction to register new fingerprint data with said fingerprint register, the instruction in the case said authorizer contains a folder name specific to the fingerprint data registered with said register.

9. A method of personal identification for use in a digital camera, comprising the steps of:
   inputting fingerprint data to the digital camera;
   checking if the inputted fingerprint data is identical with fingerprint data registered with a fingerprint register of the digital camera; and
   automatically initiating a registering of the inputted fingerprint data having a corresponding identifier with the fingerprint register in case no fingerprint data is registered with the fingerprint register.

10. The method in accordance with claim 9, further comprising the steps of:
    comparing the inputted fingerprint data with the fingerprint data registered with the fingerprint register in case the fingerprint data is registered with the fingerprint register; and
    turning off the power of the digital camera in case no fingerprint data is identified with the inputted fingerprint data.

11. The method in accordance with claim 10, further comprising the steps of:
    storing the identifier of the inputted fingerprint data in an authorizer in case the registered fingerprint data is identified with the inputted fingerprint data;
    checking if an instruction inputted to the digital camera is intended for a new fingerprint registration; and
    registering newly inputted fingerprint data with the fingerprint register in case the instruction inputted is intended for a new fingerprint registration.

12. The method in accordance with claim 11, further comprising the step of executing the instruction inputted if the instruction is intended to handle a frame of image data associated with the identifier stored in the authorizer.

13. A method for allowing access to a digital camera, comprising:
    receiving fingerprint data of a user of the digital camera;
    determining if the digital camera is being used for a first time ever; and
    registering the fingerprint data of the user when it is determined that the digital camera is being used for the first time ever.

14. The method of claim 13, wherein the fingerprint data of the user is a first fingerprint data and the step of registering the finger print data of the user when it is determined that the digital camera is being used for the first time ever comprises:
    acquiring and verifying a password associated with the user;
    acquiring a second fingerprint data of the user;
    comparing the first and second fingerprint data of the user; and
    registering the fingerprint data of the user with a fingerprint register when it is determined that the first and second fingerprint data of the user match.

15. The method of claim 14, further comprising:
    creating a storage area in a memory of the digital camera corresponding to the fingerprint data of the user.

16. The method of claim 15, wherein the storage area corresponding to the fingerprint data of the user is accessible only by the user.

17. The method of claim 13, further comprising:
    determining whether the user is a registered user when it is determined that the digital camera is not being used for the first time ever; and disallowing access when it is determined that the user is not a registered user.

18. The method of claim 17, wherein the step of determining whether the user is a registered user comprises:
    comparing the fingerprint data of the user with one or more fingerprint data of registered users of the digital camera;
    determining that the user is registered if the fingerprint data of the user matches with any of the one or more fingerprint data of registered users; and
    determining that the user is not registered if the fingerprint data of the user matches with none of the one or more fingerprint data of registered users.

19. The method of claim 17, further comprising:
    receiving an instruction from the user when it is determined that the user is a registered user; and
    registering a new user to the digital camera when the received instruction specifies registering the new user.

20. The method of claim 19, wherein the step of registering the new user to the digital camera when the received instruction specifies registering the new user comprises:
    receiving a first fingerprint data of the new user;
    acquiring and verifying a password associated with the new user;
    acquiring a second fingerprint data of the new user;
    comparing the first and second fingerprint data of the new user; and
    registering the fingerprint data of the new user with a fingerprint register when it is determined that the first and second fingerprint data of the new user match.

21. The method of claim 20, further comprising:
    creating a storage area in a memory of the digital camera corresponding to the fingerprint data of the new user.

22. The method of claim 21, wherein the storage area corresponding to the fingerprint data of the new user is accessible only by the new user or by a group to which the new user belongs.

23. The method of claim 19, further comprising:
    determining whether the registered user is authorized to issue the received instruction when the received instruction does not specify registering the new user; and
    executing the received instruction when it is determined that the registered user is authorized to issue the received instruction.

24. The method of claim 23, wherein the user is a currently registered user and the step of determining whether the registered user is authorized to issue the received instruction comprises:
    determining whether the received instruction is intended to handle a frame of image data associated with a storage area corresponding to the currently registered user; and
    executing the received instruction when it is determined that the received instruction is intended to handle the frame of image data associated with the storage area corresponding to the currently registered user.

25. The method of claim 24, wherein the storage area is considered to be corresponding to the currently registered user if the storage area is the currently registered user's private area or an area associated with a group to which the current registered user belongs.

26. The method of claim 13, further comprising:
    receiving an instruction from the user when it is determined that the digital camera is not being used for the first time ever;
    determining whether the received instruction is a restricted permission instruction; and
    executing the received instruction when it is determined that the received instruction is a restricted permission instruction.

27. The digital camera in accordance with claim 1, wherein a storage of the authorizer is volatile.

28. A method of claim 13, wherein the step of determining if the digital camera is being used for a first time ever comprises determining whether there are no registered users.

* * * * *